(12) United States Patent
Varale

(10) Patent No.: US 12,278,471 B2
(45) Date of Patent: Apr. 15, 2025

(54) SADDLE OF AN IMPROVED TYPE FOR SUPPORTING ELONGATED BODIES

(71) Applicant: FI.MO.TEC. S.P.A., Milan (IT)

(72) Inventor: Alberto Varale, Cologno Monzese (IT)

( * ) Notice: Subject to any disclaimer, the term of this patent is extended or adjusted under 35 U.S.C. 154(b) by 62 days.

(21) Appl. No.: 18/038,014

(22) PCT Filed: Nov. 26, 2021

(86) PCT No.: PCT/IB2021/061012
§ 371 (c)(1),
(2) Date: May 21, 2023

(87) PCT Pub. No.: WO2022/113016
PCT Pub. Date: Jun. 2, 2022

(65) Prior Publication Data
US 2023/0411944 A1   Dec. 21, 2023

(30) Foreign Application Priority Data
Nov. 30, 2020   (IT) ..................... 102020000028943

(51) Int. Cl.
*H02G 3/32*   (2006.01)
*F16L 3/223*   (2006.01)

(52) U.S. Cl.
CPC .............. *H02G 3/32* (2013.01); *F16L 3/2235* (2013.01)

(58) Field of Classification Search
CPC . H02G 3/32; H02G 3/34; F16L 3/2235; F16L 3/22; F16L 3/222; F16L 3/223
USPC .. 248/49, 58, 59, 61, 62, 63, 65, 67.7, 68.1, 248/70, 72, 73, 74.1, 74.3, 74.4
See application file for complete search history.

(56) References Cited

U.S. PATENT DOCUMENTS

| | | | |
|---|---|---|---|
| 3,933,377 A * | 1/1976 | Arrowood | F16L 3/00 248/62 |
| 5,723,819 A * | 3/1998 | Kirma | H02B 1/202 174/95 |
| 5,794,897 A | 8/1998 | Jobin | |
| 5,941,483 A * | 8/1999 | Baginski | F16L 3/237 248/68.1 |
| 6,079,673 A | 6/2000 | Cox | |
| 6,540,531 B2 * | 4/2003 | Syed | H01R 9/0524 248/68.1 |
| 6,561,466 B1 * | 5/2003 | Myers | F16L 3/221 248/68.1 |
| 8,157,223 B2 * | 4/2012 | Stau | F16L 3/237 248/74.2 |
| 8,882,066 B2 * | 11/2014 | Otten | F16L 1/24 248/230.8 |

(Continued)

FOREIGN PATENT DOCUMENTS

WO   2017060199   4/2017

*Primary Examiner* — Christopher Garft
*Assistant Examiner* — Michael McDuffie
(74) *Attorney, Agent, or Firm* — Themis Law

(57) ABSTRACT

A saddle for supporting elongated bodies such as cables, pipes and the like includes a body with a rectangular or quadrangular section, obtained by coupling two half-saddles. Each half-saddle has an outer portion or shell made from a plastic material and an internal portion or core made from an elastomeric material, on which one or more grooves are defined for housing the elongated bodies and which, when the two half-saddles are coupled, define one or more continuous rings for retaining an elongated body.

14 Claims, 14 Drawing Sheets

(56) References Cited

U.S. PATENT DOCUMENTS

| | | | |
|---|---|---|---|
| 8,967,556 B2* | 3/2015 | Meyers | H02G 3/32 |
| | | | 248/68.1 |
| 8,985,533 B2* | 3/2015 | Edmond | F16L 3/1222 |
| | | | 248/74.1 |
| 10,221,994 B2* | 3/2019 | Baiera | F16L 3/237 |
| 10,411,452 B2* | 9/2019 | Varale | H02G 3/32 |
| 10,865,912 B2* | 12/2020 | Bechtold | H02G 3/32 |
| 11,125,358 B2* | 9/2021 | Leeson | H02G 3/32 |
| 11,189,997 B2* | 11/2021 | Yang | B60K 7/0007 |
| 2007/0246614 A1 | 10/2007 | Allman | |
| 2008/0185183 A1* | 8/2008 | Chen | H02G 3/32 |
| | | | 174/651 |
| 2014/0175231 A1* | 6/2014 | Cox | H02G 3/04 |
| | | | 248/68.1 |
| 2014/0299723 A1 | 10/2014 | Kato | |
| 2015/0192225 A1* | 7/2015 | Vo | H02G 3/32 |
| | | | 29/466 |
| 2017/0030486 A1* | 2/2017 | Sampson | F16L 3/2235 |
| 2018/0320800 A1 | 11/2018 | Pieske | |
| 2019/0323632 A1 | 10/2019 | Bechtold | |

* cited by examiner

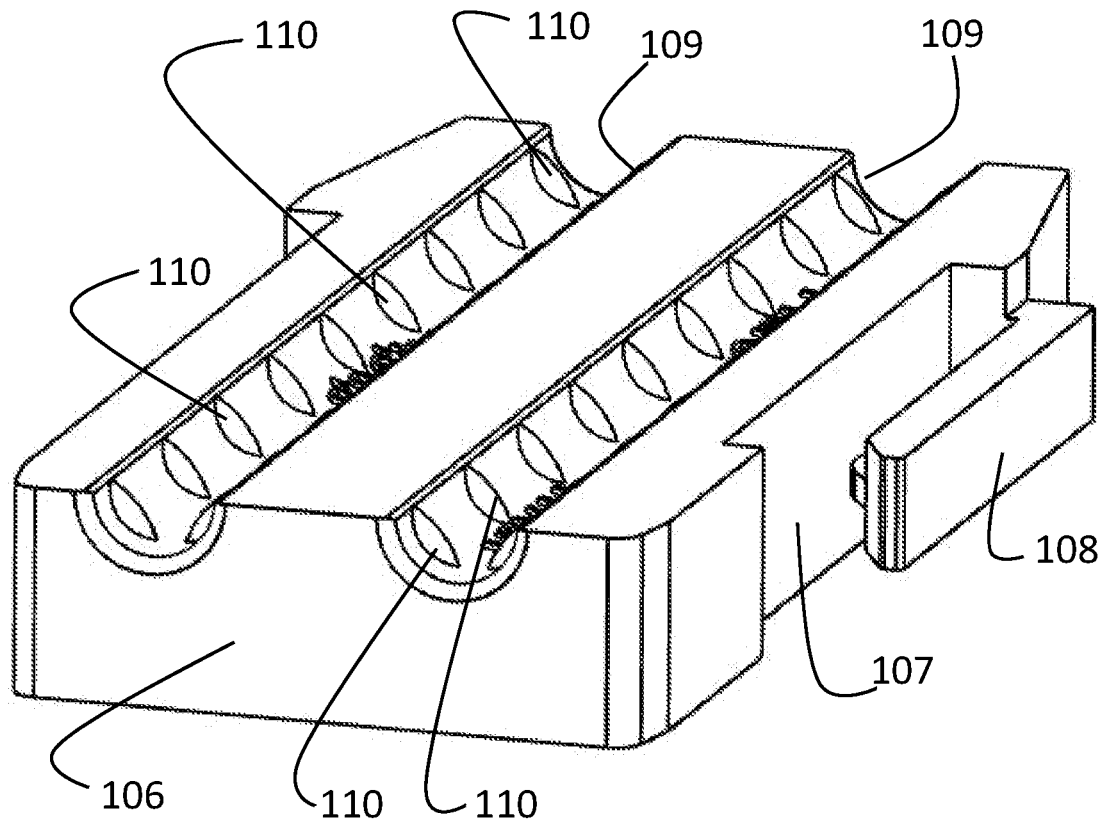
PRIOR ART  Fig.1a

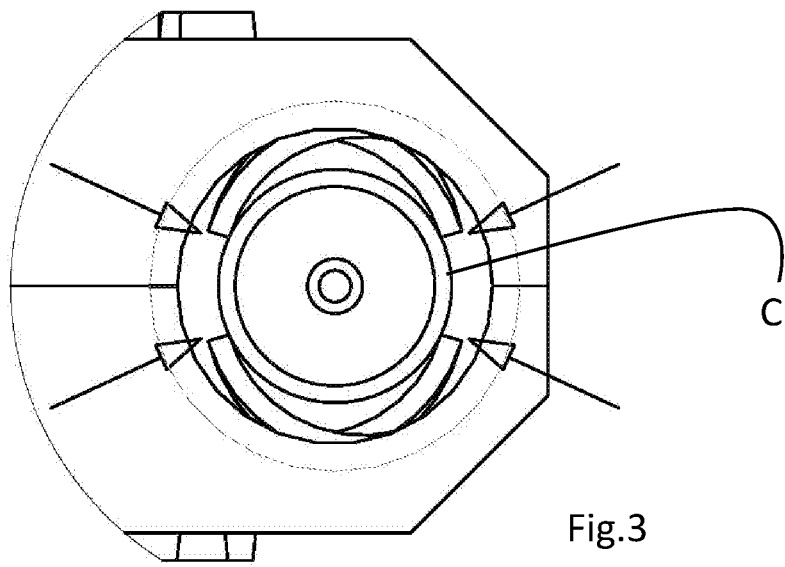
Fig.3
PRIOR ART
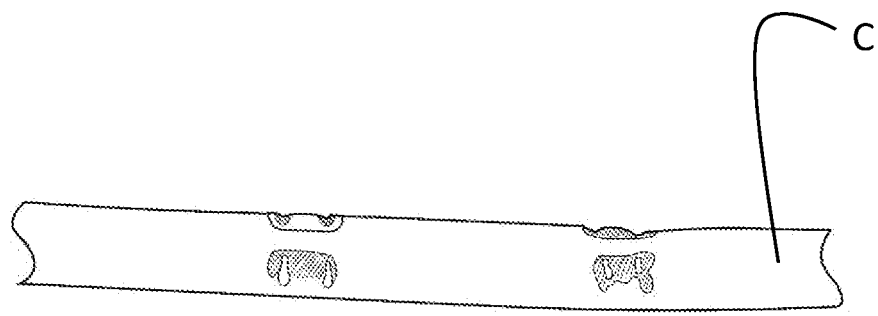
PRIOR ART          Fig.3a
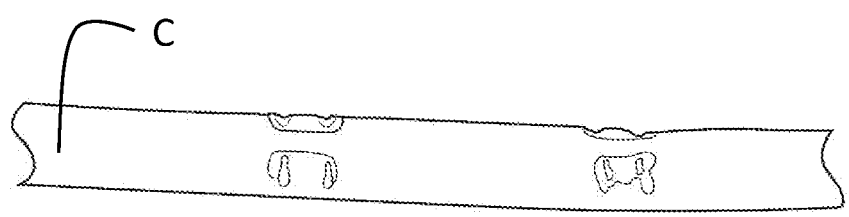
PRIOR ART          Fig.3b

PRIOR ART　　　PRIOR ART

SADDLE OF AN IMPROVED TYPE FOR SUPPORTING ELONGATED BODIES

The present invention relates to an improved saddle for supporting elongated bodies such as cables, pipes and the like, on a support, for example pylons used for supporting telecommunication antennas.

The field of the invention relates to cable-clamp systems used for supporting elongated bodies in general, such as electric cables, coaxial cables, optical-fiber cables and the like, in installations, for example in the field of telecommunications.

In this sector, it is important that the cable clamp exert an effective supporting action on the cable, preventing it from sliding or moving from its seat, due to its own weight or the action of atmospheric agents.

In this type of application there is also the need for making the cable clamp as universal as possible towards the different diameters of the cables, from the smallest ones, such as optical-fiber cables, to those having a larger diameter, such as coaxial cables.

Current cable clamps consist of two half-saddles made of rigid plastic material, reciprocally coupled for forming the respective housing seats for the cables to be supported. The joining between the two half-saddles is effected by means of threaded bars that pass through the half-saddles in correspondence with a respective hole, or by means of U-bolts inside which the saddles are coupled.

FIGS. 1 to 3a show three possible known solutions of cable clamps for fixing so-called power and optical-fiber cables in telephone towers used for distributing the radio signal (voice and data) of mobile networks (2G, 3G, 4G, etc.).

FIG. 1 illustrates a cable clamp with a saddle for a power cable and a saddle for two optical fibers.

Figure 1:
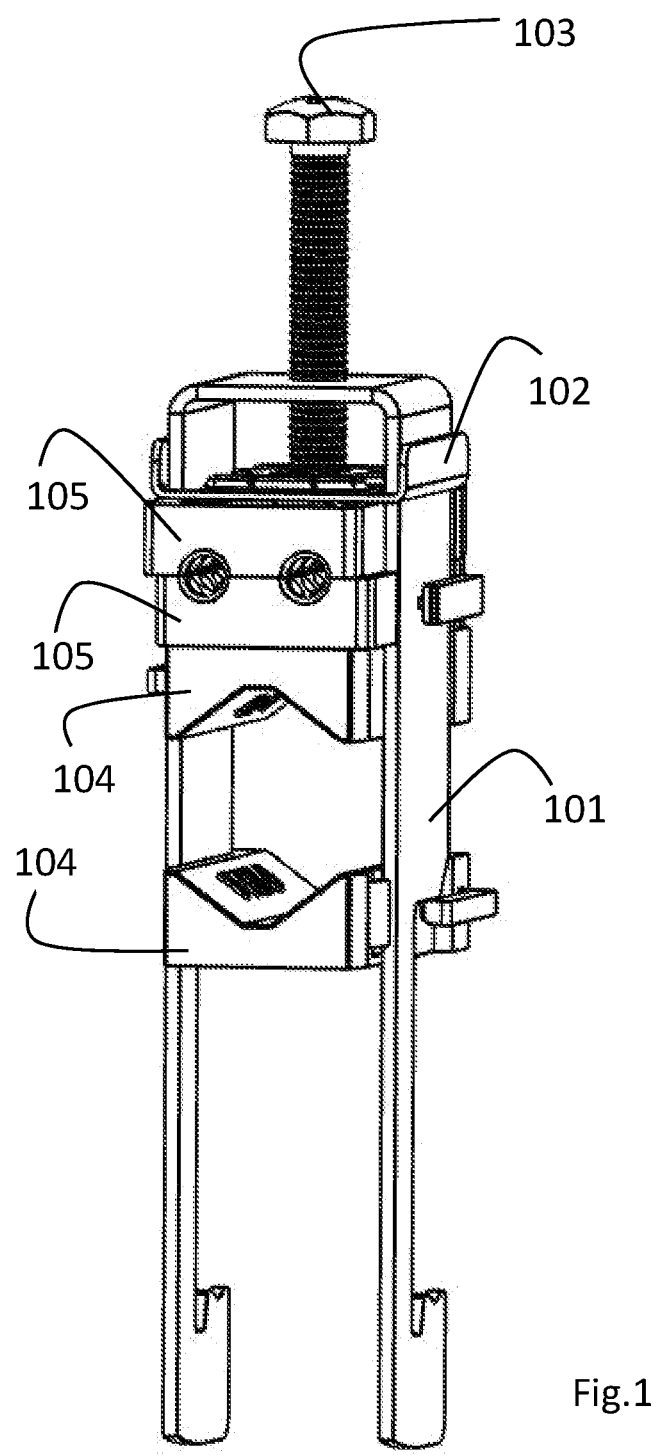

The cable clamp is composed of a steel U-bolt 101, a thrust plate 102, a blocking screw 103, a pair of "V"-shaped half-saddles 104 for blocking a power cable (not shown) and a pair of calibrated half-saddles 105 for fixing two optical-fiber cables (not shown).

The saddles are entirely made of plastic material, in particular rigid plastic material.

FIG. 1a illustrates a half-saddle 105 of the pair of half-saddles for fixing two optical-fiber cables (not shown).

Each half-saddle 105 that forms the saddle is composed of a body 106, a seat 107 for the U-bolt, a clip or flap 108 for fixing to the U-bolt and two longitudinal grooves 109 for the cables (not shown).

The grooves 109 for the cables contain a plurality of teeth 110 for a more accurate blocking of the cables. The teeth 110 also allow the fixing of cables having a reduced range of diameters.

Figures 2, 2A:
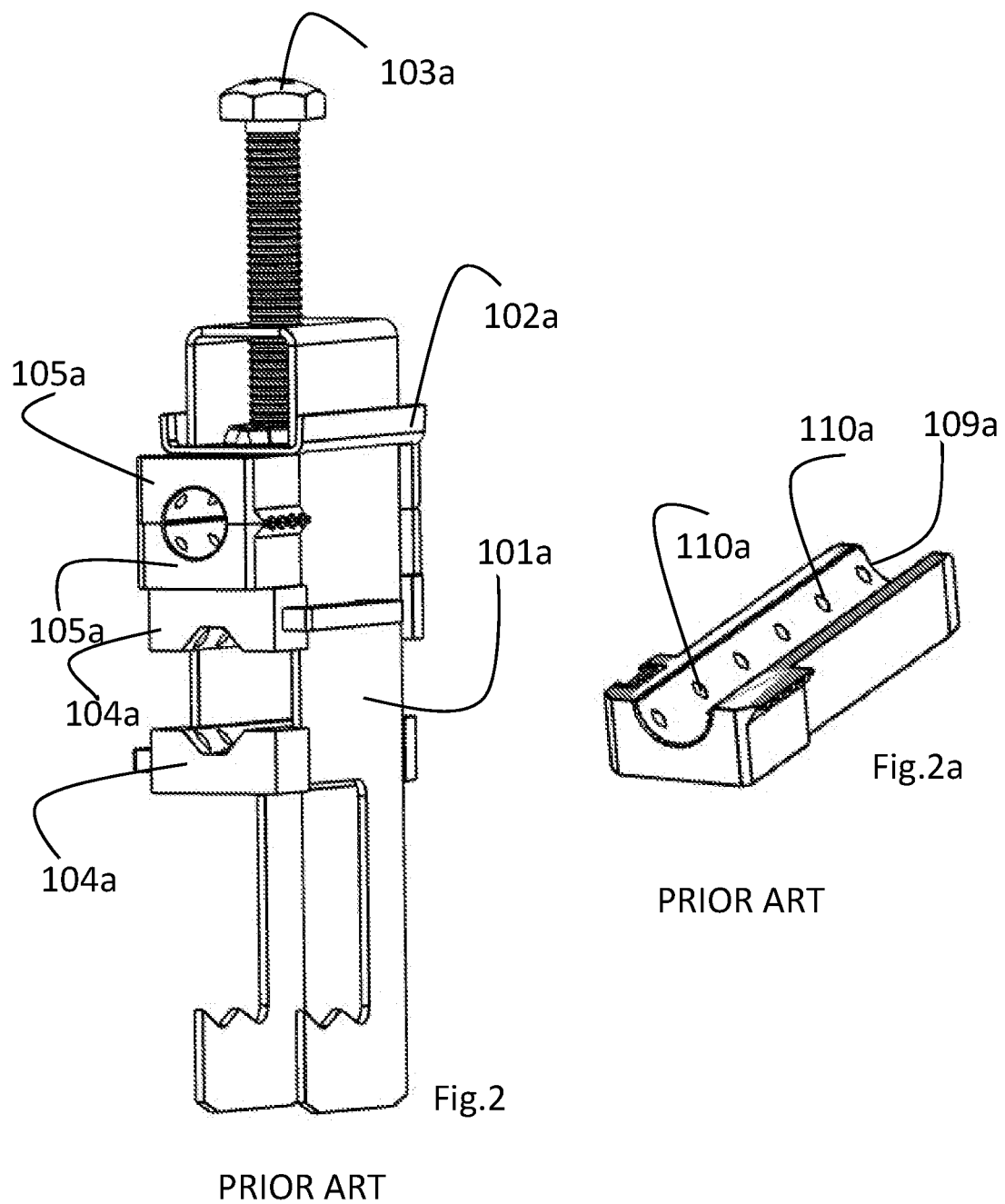

FIGS. 2 and 2a illustrate a variation of the cable clamp of FIG. 1 and the relative saddle for fixing a single optical-fiber cable in which each half-saddle 105a is equipped with a single longitudinal groove 109a for housing the cable (not shown), which provides the fixing teeth 110a in its interior.

The half-saddles 105 and 105a used in this type of cable clamp have two disadvantages linked to the presence of the blocking teeth 110 and 110a:
- the teeth, indispensable for a correct fixing of the cables, allow the housing of cables having a limited range of diameters (about 1 mm), requiring a wide range of saddles for fixing cables with different diameters.
- the teeth tend to leave an imprint on the outer sheath of the cable. This effect can cause, in the case of installation in environments with severe weather conditions (extreme and/or adverse), the perforation of the outer sheath of the cable with a consequent reduction in the IP degree (protection against the entry of water and dust) of the cable itself.

Document WO2017/060199 describes a cable-fixing device of the type comprising two saddles provided with seats for housing the cables provided with a plurality of elastically deformable flaps having, in rest position, a free end raised towards the inside of said seat. Said flaps are in fact fixed at one end to the frame of the housing seat of the cable and flex, rotating around the point in which they are hinged.

Thanks to the flaps, the fixing device is compatible both with cables having a small diameter, where the flexing of the flaps is only partial, and also with cables having a larger diameter where the flexing of the flaps is complete.

Said device however has various drawbacks.

Said flaps embrace the cable on a portion of casing, i.e. they rest on arched portions of the circumference of the cable (FIG. 3).

The pressure exerted on the cable by the flaps, in order to keep said cable firmly housed in the device, is greater at the free end of each flap and is not constant along the whole flap, as shown by the arrows in FIG. 3: the pressure exerted on the cable, if this is large, can be high but is not uniformly distributed over the entire diameter of the cable. Furthermore, the edge of the flap can affect the protection sheath of the cables (for example the optical-fiber protection sheath), as illustrated in FIGS. 3a and 3b, with the consequent risk of breakage and reduction in the IP degree (protection against the entry of water and dust) of the cable itself. In order to overcome these drawbacks, saddles are sometimes chosen with the seat of the cable larger than the diameter of the cable and a tubular gasket is interposed between the saddle and the cable.

Figures 4, 4A:
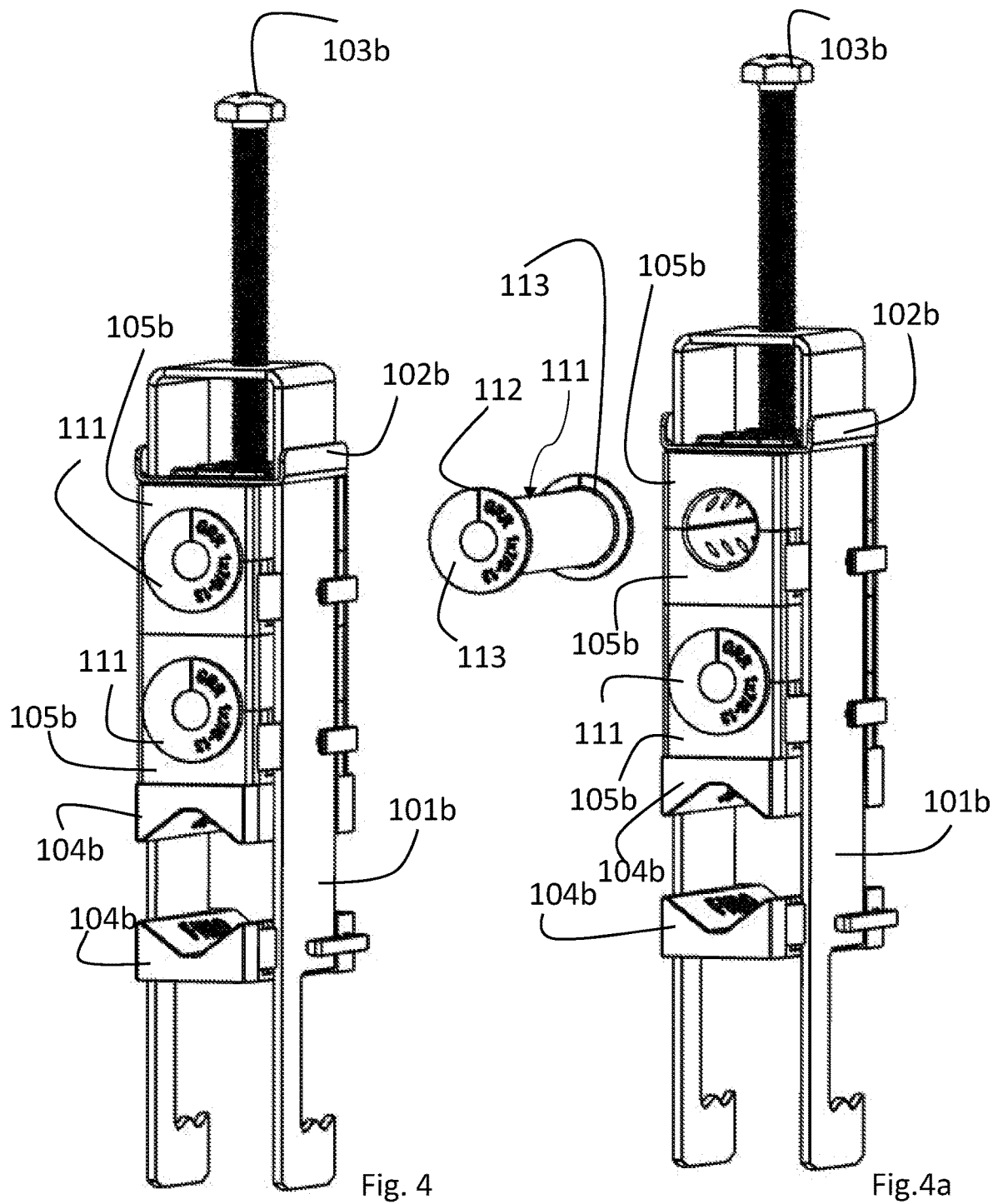

FIGS. 4 and 4a illustrate this latter solution of the known art.

The tubular-shaped gaskets 111 are made of elastomeric material.

The tubular gasket 111 is provided with a notch 112 for allowing its installation around the cable (not shown).

Furthermore, the gasket 111 is equipped with two flanges 113 for blockage with respect to the pair of half-saddles 105b, said flanges 113 being abutted against the head sides of the saddles, as illustrated in the figures.

From how the tubular gasket 111 was conceived, it appears evident that it must first be laid around the cable and subsequently positioned inside the seat produced by coupling the pair of half-saddles.

This operation must be effected before installing the cable clamp on the tower, which is completed by tightening the blocking screw 103b.

This involves a greater number of components for completing the installation, a more complex installation procedure and larger dimensions of the cable clamp due to the fact that a larger saddle had to be used for allowing the inter-positioning of the gasket between the seat of the saddle and the cable.

The main objective of the present invention is to provide a new saddle of an improved type for supporting elongated bodies which, with respect to the saddles of the known art, allows the saddle to be compatible with different types of cables, i.e. cables with a wide range of diameters, which enables a safe and stable housing of the cable, whether it be in a vertical or horizontal position with respect to the ground, without the risk of perforating the outer sheath of the cables, which in the case of optical-fiber cables is generally relatively thin and made with materials that are not very rigid, and without the need for resorting to the use of gaskets.

A further main objective of the present invention is to provide a new saddle of an improved type for supporting elongated bodies which can be stacked on other saddles of the same type and/or on saddles already installed.

These and other objectives are achieved with the saddle produced according to claim 1.

Preferred ways of producing the saddle of the invention are evident from the remaining claims.

According to the present invention, the saddle is obtained by coupling two half-saddles, each produced by combining an outer part in plastic material and an internal part in elastomeric material.

In particular, the saddle according to the invention comprises a body with a rectangular or quadrangular section, obtained by coupling two half-saddles and each half-saddle comprises an outer portion or shell in plastic material and an internal portion or core in elastomeric material on which one or more grooves for housing said elongated bodies are formed.

The grooves of each half-saddle are provided with one or more radial protrusions in elastomeric material produced in the form of a half-ring or arc of a ring, said radial protrusions, when the two half-saddles are coupled, exerting a uniformly distributed pressure on the circumference of the at least one cable housed in said saddle.

Said radial protrusions produced in the form of a half-ring or arc of a ring on each half-saddle, when said half-saddles are coupled with each other, are positioned facing each other to form at least one continuous ring, or continuous annular band, for retaining the cable inside the saddle.

Thanks to said at least one ring formed by the coupling of two corresponding radial protrusions, respectively provided on each half-saddle, the gripping force exerted on the cable is distributed over the whole circumference of the cable itself.

The cable is therefore kept stably inside the saddle whether it be in a horizontal position or whether the cable be positioned vertically with respect to the ground and therefore also subject to weight force: said at least one ring formed by the coupling of two corresponding radial protrusions of each half-saddle ensures that the cable does not "slip" towards the ground thanks to the friction exerted by the ring, or band having a certain thickness, on the surface of the cable, without the risk of perforating the cable sheath, as can happen with the flaps described in the known art.

Said radial protrusions are positioned equidistant from each other along the longitudinal extension of the grooves of each half-saddle and, in the coupled condition of the two half-saddles, they face each other so as to reduce, in their correspondence, the internal diameter of the housing or seat for an elongated body in order to allow the fixing, between the two saddles, of elongated bodies having a wide range of diameters.

Said at least one continuous ring for retaining the cable inside the saddle exerts a uniformly distributed pressure over the whole diameter of the cable, guaranteeing, also thanks to the elastomeric material with which it is made, a stable and safe positioning of the cable, without the need for producing teeth 110 in the grooves and without the risk of perforating the outer protection sheath of the cables.

Furthermore, a saddle made of elastomeric material alone could not solve the above problems: the thrust transmitted by the plate 102, 102a, 102b by means of the screw 103, 103a, 103b must act on all the saddles inserted inside the U-bolt 101, 101a, 101b. It appears evident that, if the saddles consisting of two half-saddles 105, 105a, 105b, were made entirely of elastomeric material, the thrust transmitted by the plate 102, 102a, 102b would not have the desired effect on the saddles 104, 104a, 104b but would be partly dissipated by the elastomer not allowing a correct fixing of all of the cables. This effect would also be amplified in the periods in which the temperatures are higher, due to the known deterioration of the mechanical characteristics of elastomeric materials at high temperatures.

In relation to known saddles, the saddle according to the present invention also offers the advantage of being able to be stacked with other saddles on the U-bolt thanks to the presence of means that allow it to be coupled, without however having to resort to the use of tools and similar auxiliary equipment.

The saddle, object of the invention, allows cables with very different diameters to be effectively fixed, even without the need for using traditional gaskets and without damaging the surface. In this way, the cable clamp is made compatible with cables having different diameters, without having to bear the higher costs due to the use of the known gaskets.

The saddle, object of the invention, also offers the advantage of being able to calibrate the force with which it holds the cable, thanks to the elastic behaviour of the internal portion made of elastomeric material. In particular, the elastomeric material compensates for the deformations induced by engagement with cables having a larger diameter and consequently allows the fixing stress of the cable to be regulated according to the diameter and therefore also the weight of the same, thus also ensuring the retention of heavier cables.

Figure 5:
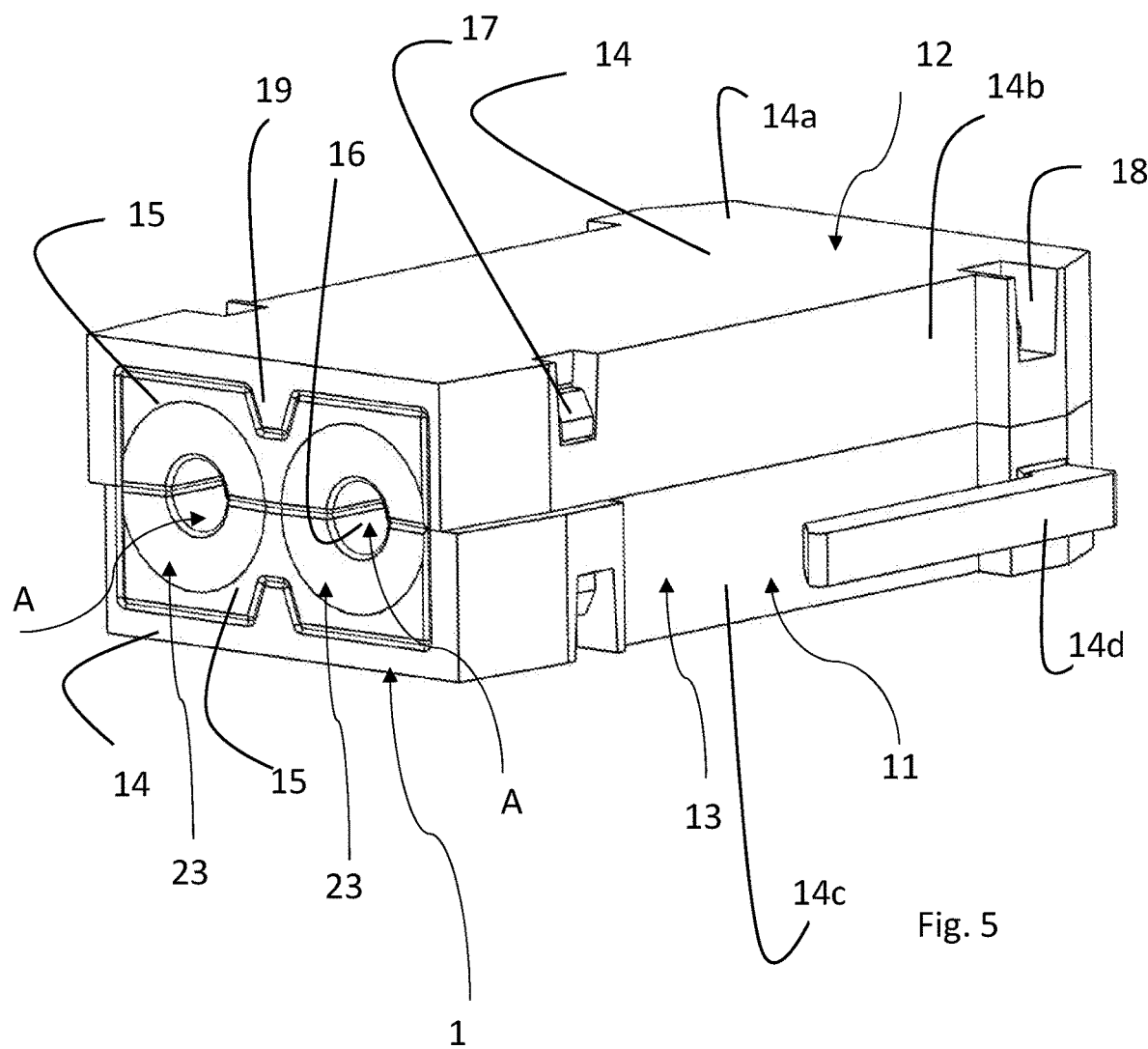
Figure 6:
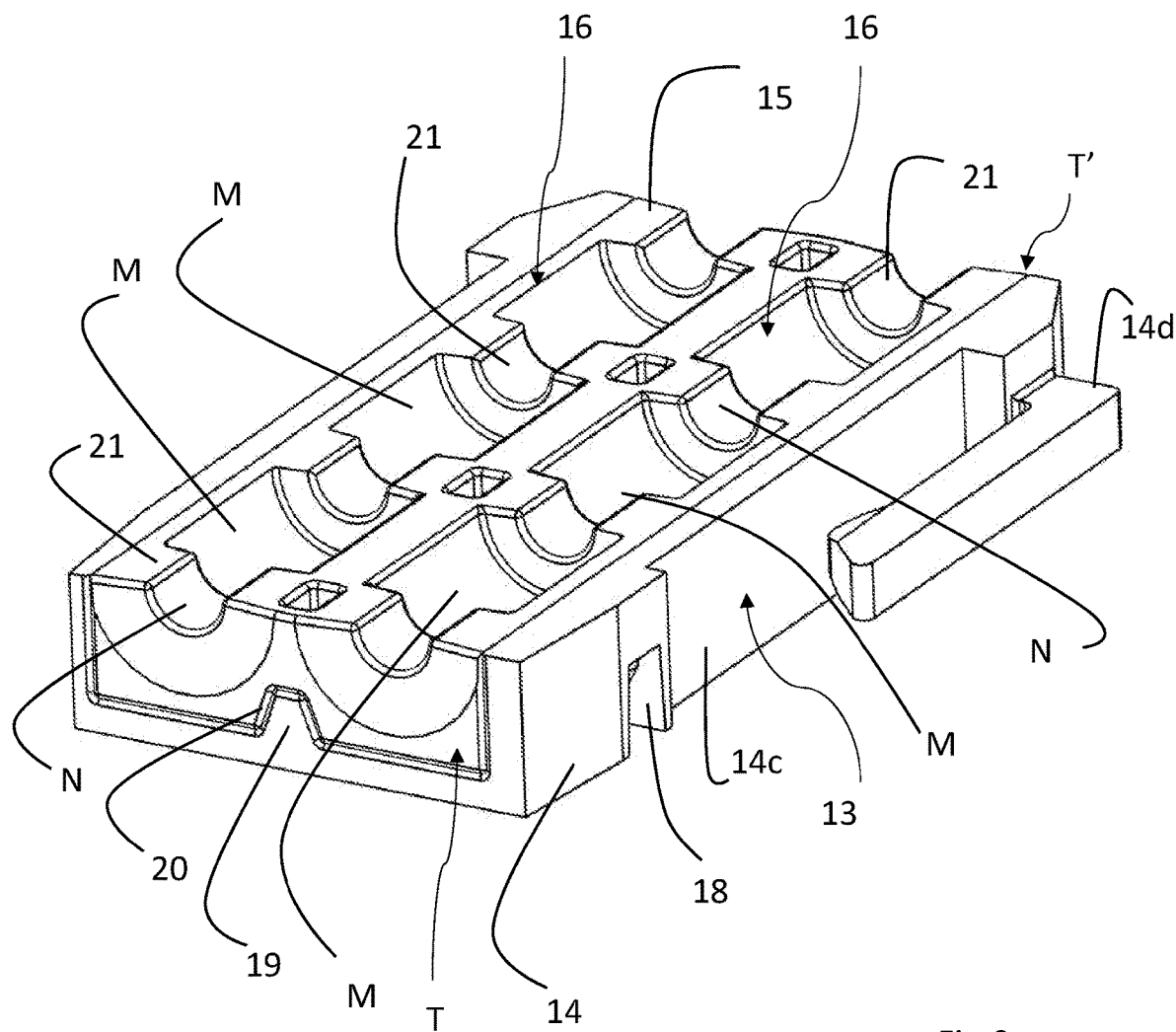
Figure 7:
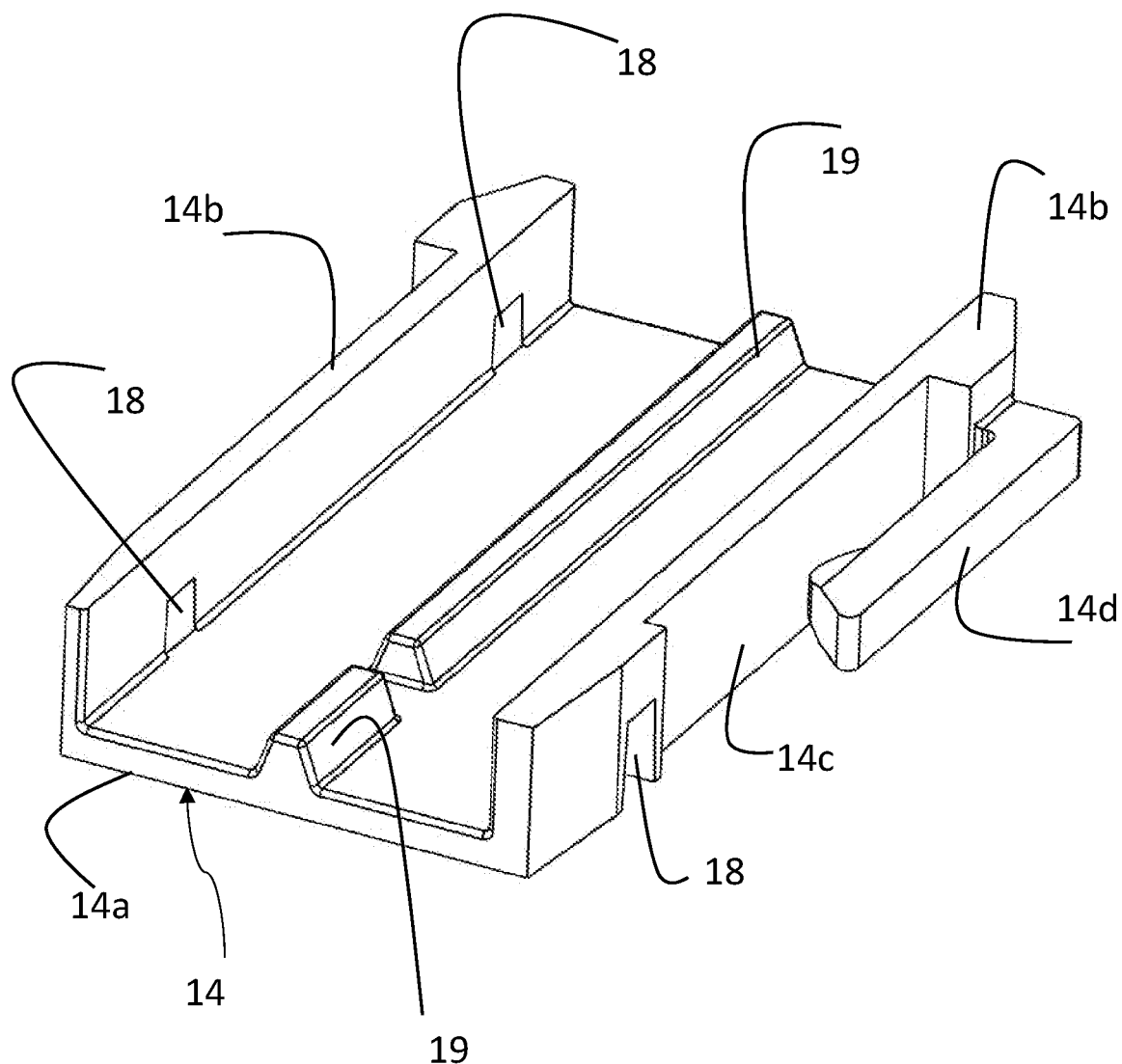
Figure 8:
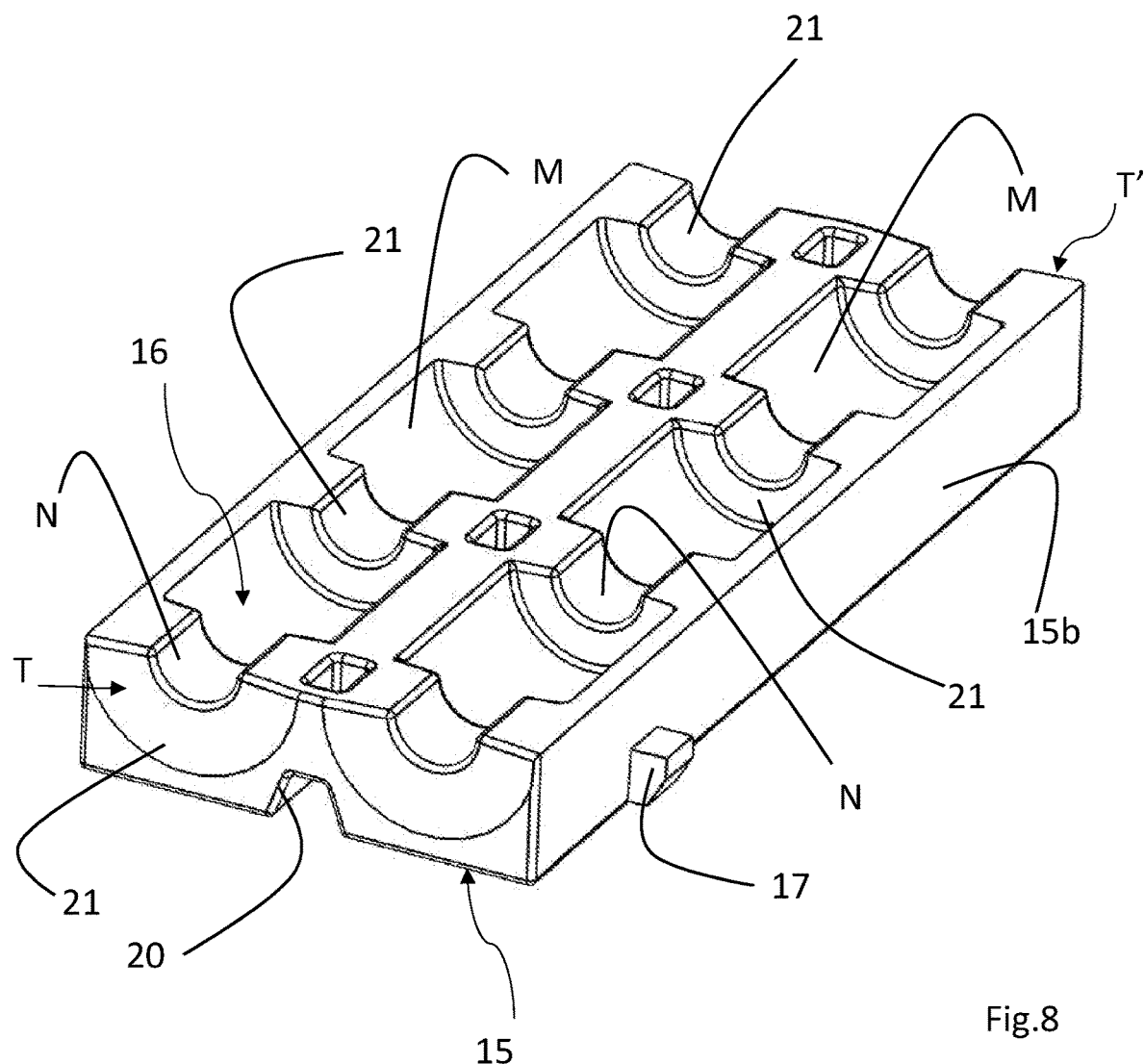
Figure 9:
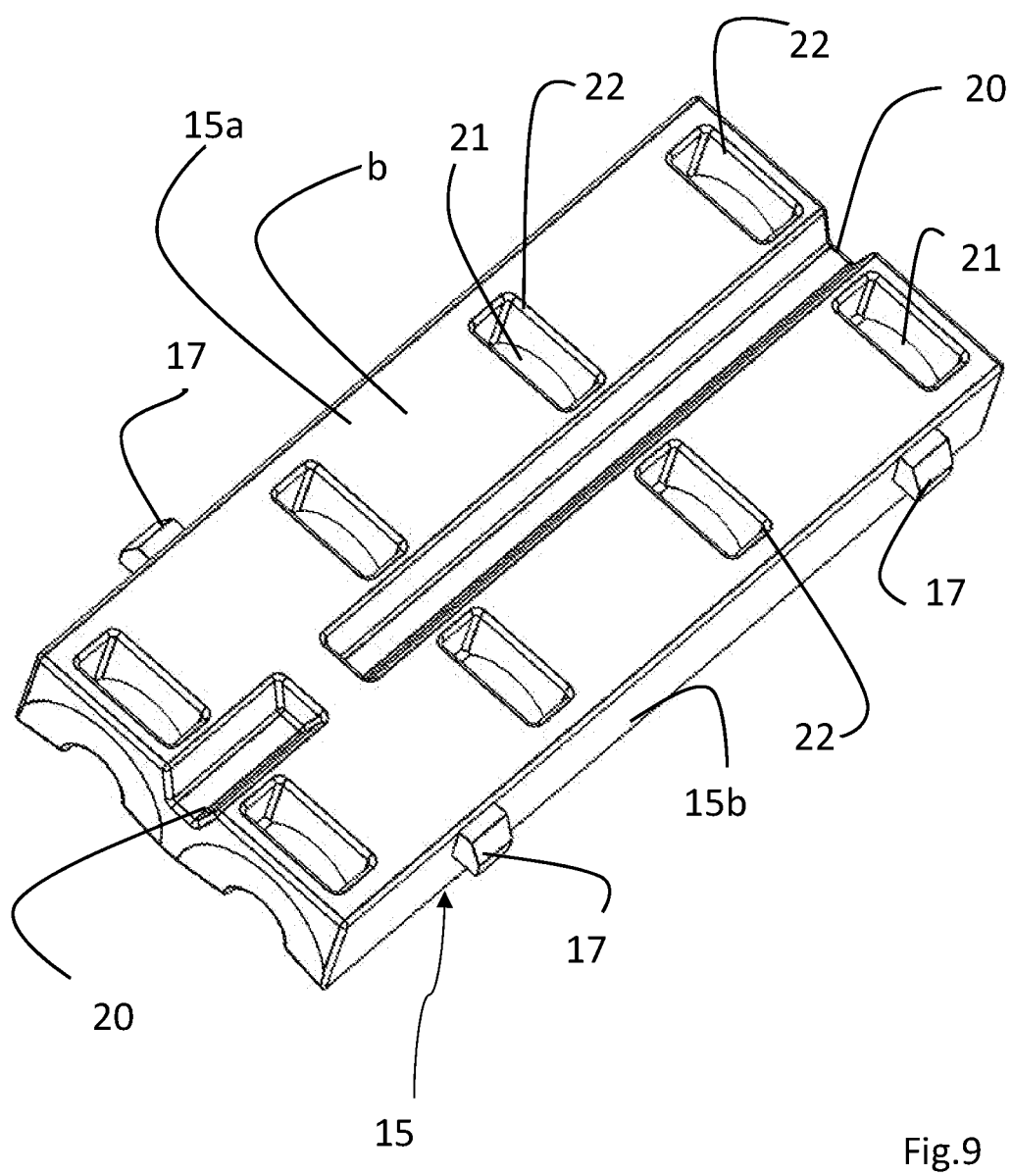
Figure 10:
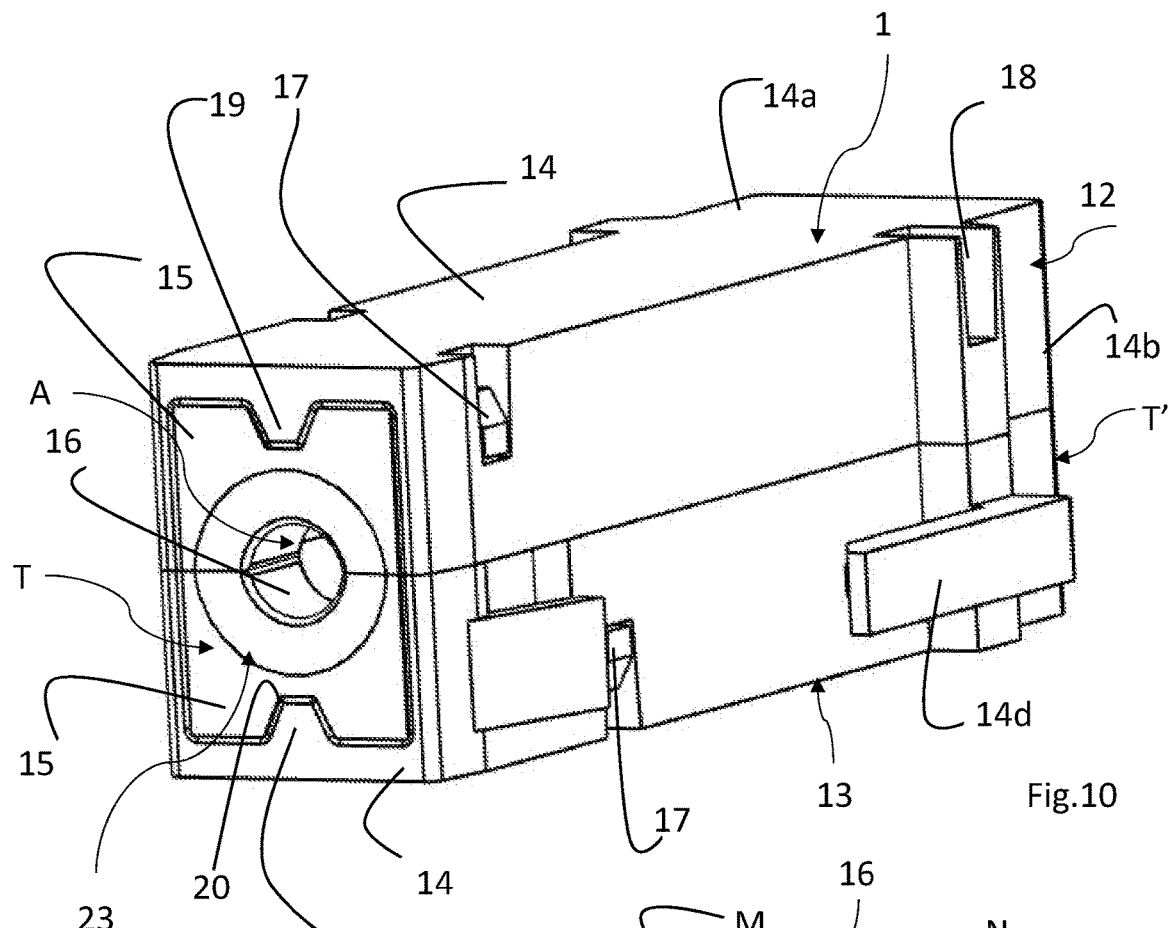
Figure 11:
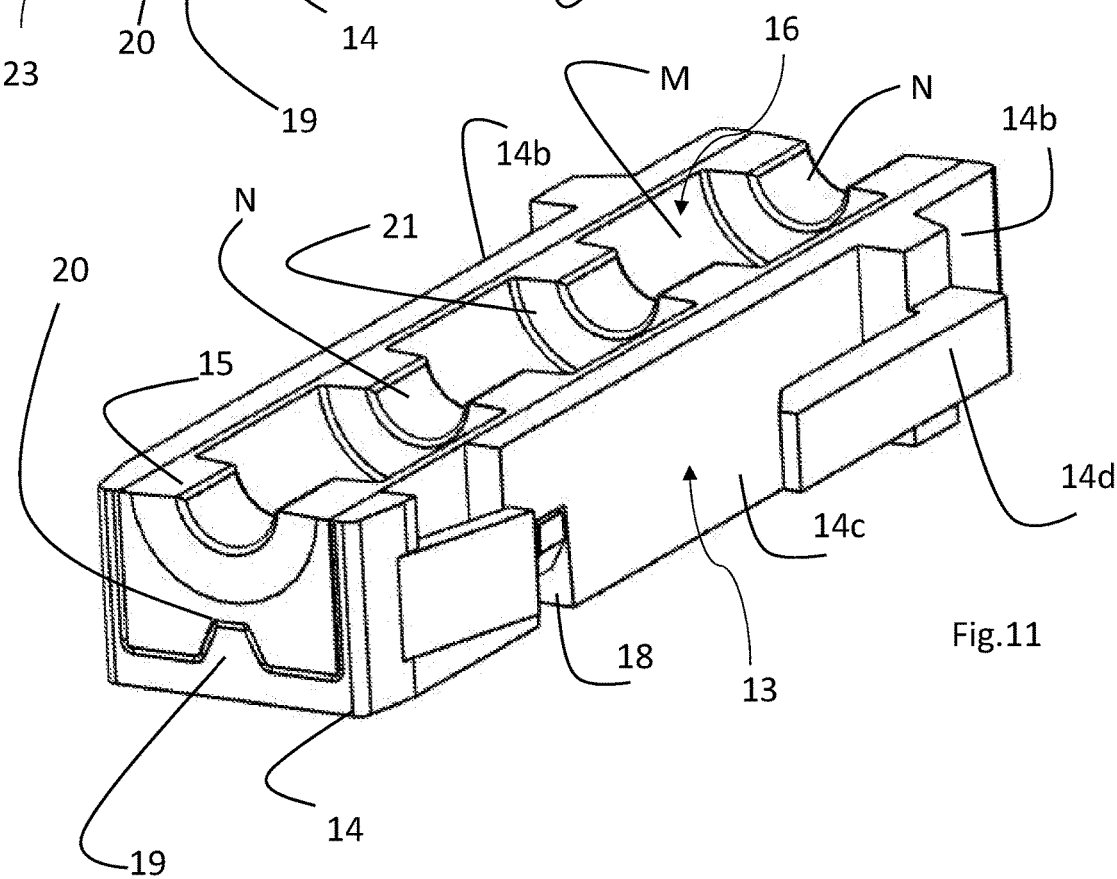
Figure 12:
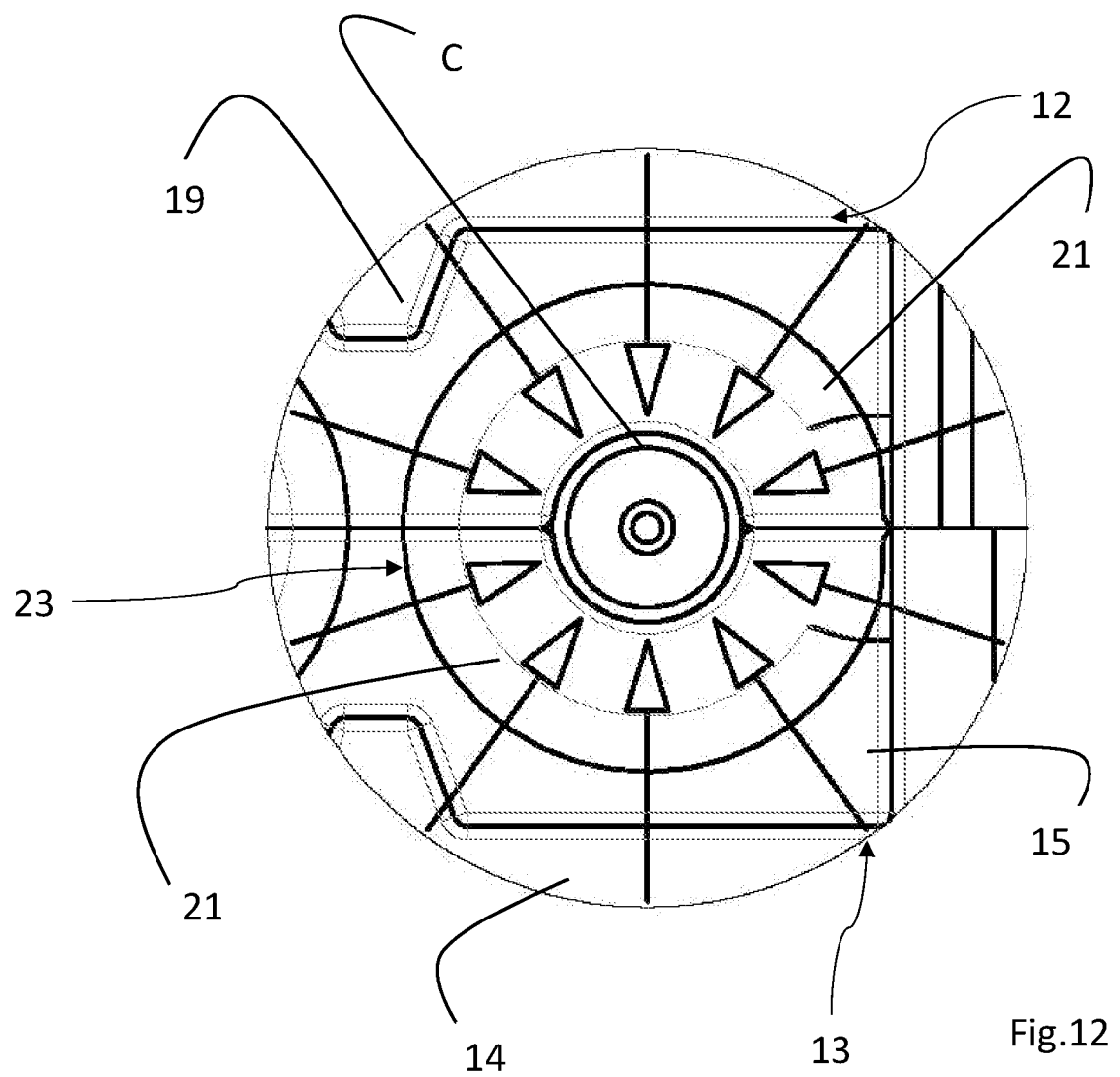
Figure 13:
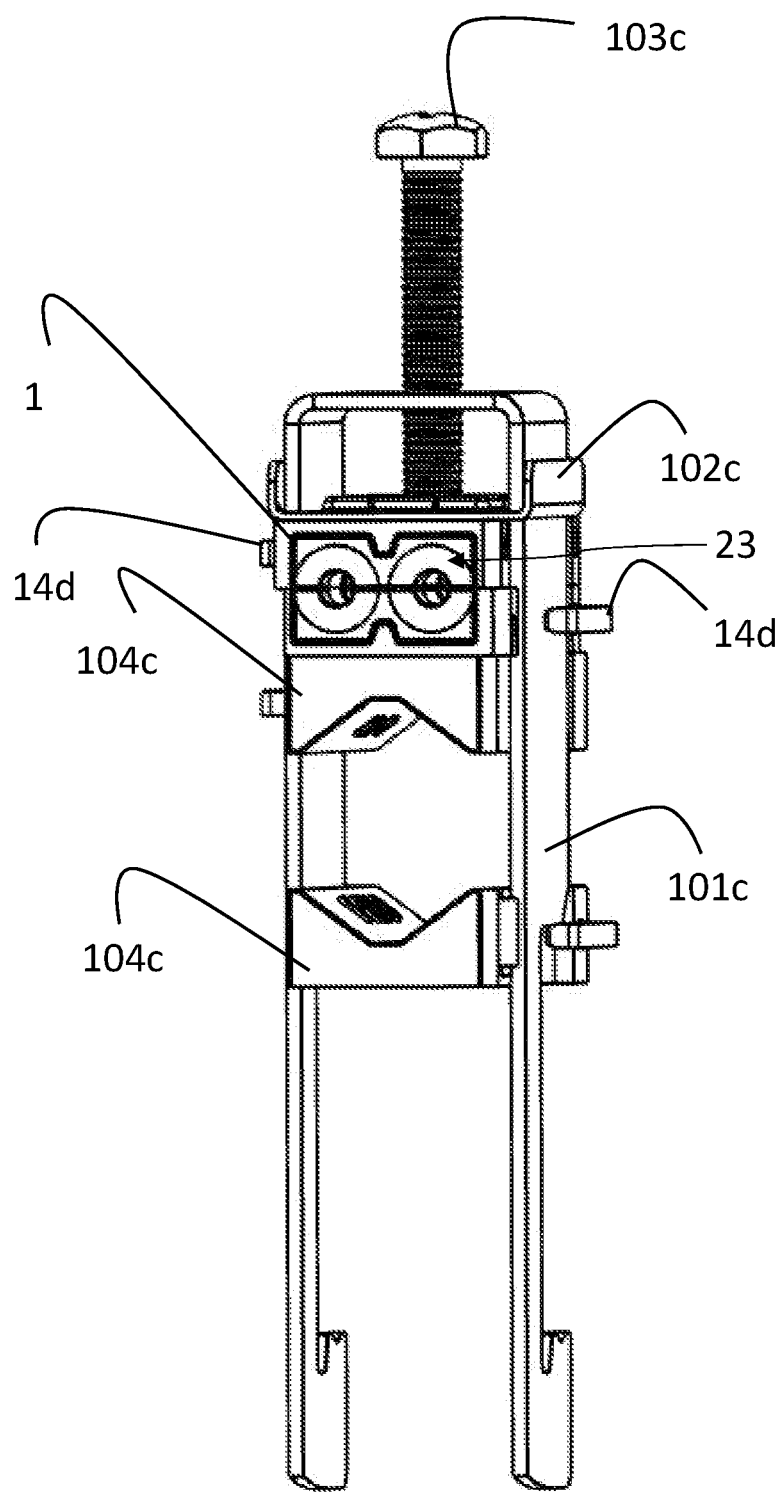
Figure 14:
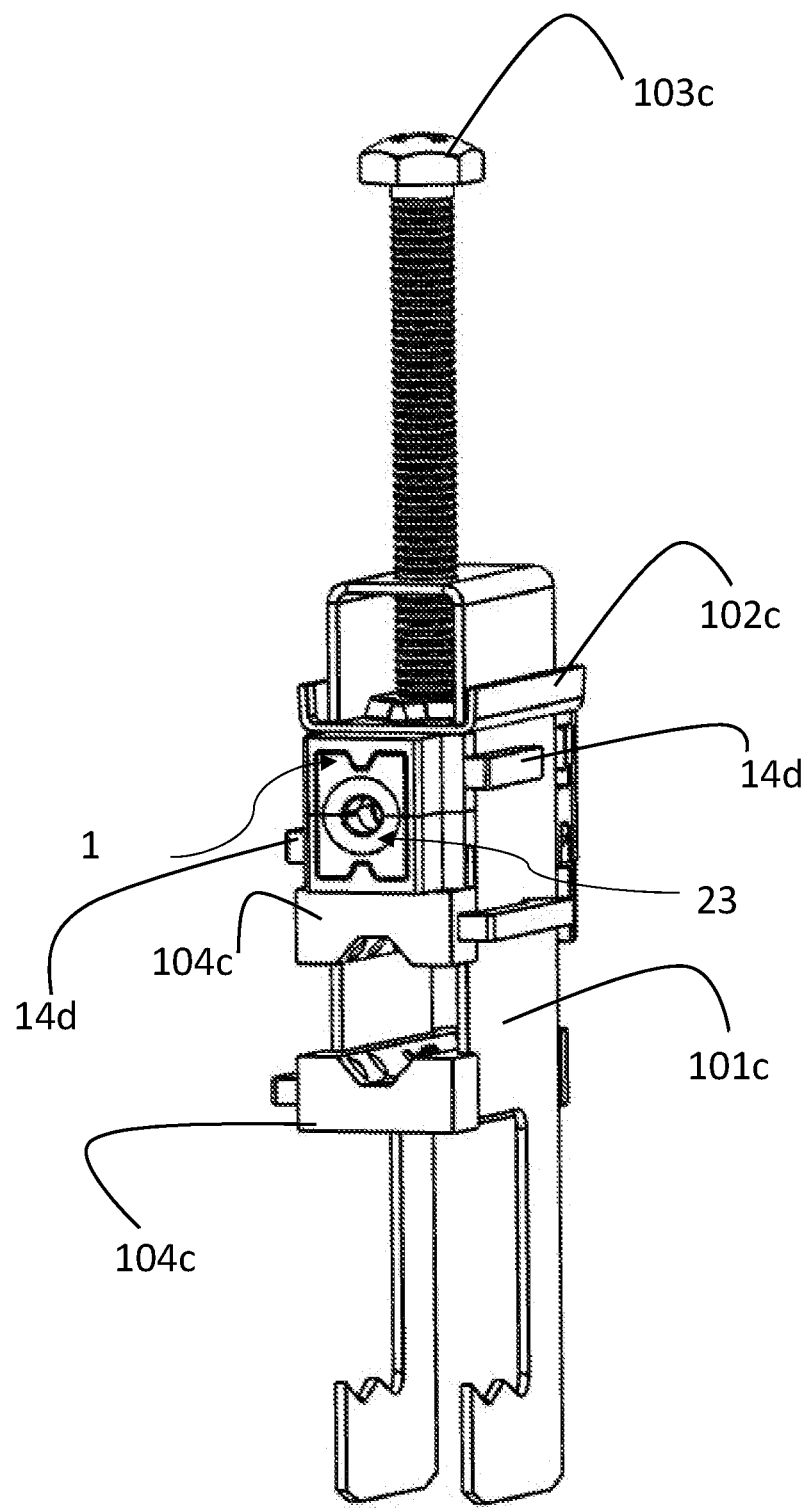

These and other objectives, advantages and characteristics of the present invention will become more evident from the following description of some embodiment examples illustrated in the attached drawings in which:

FIGS. 1-4a illustrate a cable clamp of the known art, in which the saddles are held by means of a U-bolt;

FIG. 5 is a perspective view of an embodiment example of the stackable saddle produced according to the present invention;

FIG. 6 is a perspective view of a half-saddle which forms the saddle of FIG. 5;

FIG. 7 is a perspective view of a first outer portion of the half-saddle of FIG. 6;

FIG. 8 is a perspective view of a second internal portion of the half-saddle of FIG. 6;

FIG. 9 is a perspective view from the base of the second internal portion which, in an assembled condition, is in contact with the internal base of the first outer portion of the half-saddle of FIG. 6;

FIG. 10 illustrates a perspective view of a second embodiment example of the stackable saddle of the invention;

FIG. 11 is a perspective view of a half-saddle which forms the saddle of FIG. 10;

FIG. 12 illustrates the pressure distribution on the cable in correspondence with each retention ring of the cable, produced by coupling two half-saddles;

FIG. 13 illustrates a cable clamp provided with the saddle according to the first embodiment of the present invention;

FIG. 14 illustrates a cable clamp provided with the saddle according to the second embodiment of the present invention.

The cable-clamp device of the prior art, illustrated in FIGS. 1-4a, comprises a saddle formed by a pair of half-saddles 105, 105a, 105b which, upon joining, form the seats for supporting respective cables, not shown.

For supporting the saddles on the cable clamp, the latter provides a U-bolt 101, 101a, 101b, a plate 102, 102a, 102b and a fixing screw 103, 103a, 103b.

In order to overcome the disadvantages of the known art as described above, the saddle of the invention, indicated as a whole with 1 in FIG. 5, substantially consists of a body with a rectangular or quadrangular section 11 obtained by coupling two half-saddles 12, 13 held in a closed position on the respective cable(s) C in the U-bolt 101c by a thrust plate 102c and by a blocking screw 103c, as illustrated in FIGS. 11 and 12.

A pair of "V"-shaped half-saddles 104c can be used for blocking a power cable (not shown).

Each half-saddle 12 and 13 of the saddle 1 of the invention comprises an outer portion or shell 14 made of plastic material and an internal portion or core 15 made of elastomeric material on which the grooves 16 for housing the cables are formed.

The elastomeric material of which the grooves 16 for the cables are made, allows the cable C itself to be held stably, without the need for creating projections that can damage the protective sheath of the cable C.

In particular, the material with which the outer shell 14 is made, is rigid plastic material.

The saddle 1 object of the invention is a stackable saddle.

The portion or outer shell 14 consists of a base 14a and two side walls 14b.

Said base 14a can be square or rectangular in shape.

The corresponding internal portion or core 15 is in the form of a compact block made of elastomeric material with a rectangular or square section.

The coupling of said two parts 14, 15 forms a half-saddle 12, 13.

The coupling of two half-saddles 12, 13 forms saddle 1.

At least one of the two side walls 14b externally has at least one recess which forms a seat 14c for the arm of the U-bolt 101c, a clip or flap 14d for fixing to the arm 101c of said U-bolt.

The coupling between the outer shell 14 and the internal portion or core 15 is effected by means of at least one tooth 17 present on the internal portion or core 15, which is inserted into at least one corresponding seat 18 formed on the outer portion or shell 14, or vice versa (embodiment not illustrated).

As shown in FIG. 8, said at least one tooth 17 is positioned externally on the side wall 15b of the core made of elastomeric material and is snap-inserted, having a sloping invitation surface, into at least one corresponding seat or opening 18 present on the side wall 14b of the outer portion or shell 14.

As shown in FIG. 7, according to a preferred embodiment, there are three teeth 17 and corresponding openings 18, two positioned on one side, and one on the opposite side, of the core 15 and shell 14 respectively, so as to always insert the core 15 inside the respective shell 14 with the right orientation.

This is important during the assembly phase, for a correct assembly at a glance, for saddles with a housing for two cables having different diameters.

Furthermore, as illustrated in FIGS. 7 and 9, the coupling between the outer shell 14 and the internal portion or core 15 is also effected by means of at least one discontinuous projection 19, which extends longitudinally on the internal face of the base 14a of the outer portion or shell 14, which is combined with at least one corresponding neck 20 formed longitudinally on the face B of the base 15a of the internal portion or core 15, said face B facing the outer portion or shell 14 in the assembled condition of the half-saddle 12, 13.

Said projection 19 and the corresponding neck 20 are discontinuous, i.e. with an interruption in correspondence with one end of each half-saddle so as to ensure a correct assembly, i.e. the correct mounting orientation of the core 15 inside the shell 14.

As illustrated in FIG. 6, said at least one projection 19 and neck 20 are produced in a central position, longitudinally between the two grooves 16 or, as illustrated in FIG. 10, in a central position, longitudinally in correspondence with the base of the single groove 16 of the half-saddle 12, 13.

Said at least one projection 19 and neck 20 are therefore preferably produced in a central position, longitudinally on said base 14a of the outer portion or shell 14 and said base of the internal portion or core 15 in the direction of the groove(s) 16 for housing said elongated bodies.

It is obviously also possible to provide said at least one projection 19 and neck 20 positioned transversely with respect to the direction of the groove(s) 16 (embodiment not shown).

The coupling between the outer portion or shell (outer body) 14 made of plastic material and the internal portion or core (inner block) 15 made of elastomeric material can be effected by pre-assembly or by co-moulding.

The groove(s) 16 for housing the cables formed as longitudinal grooves in the internal portion or core 15 of the saddle 1 have a semi-circular profile.

With the coupling of the two half-saddles 12 and 13, the grooves 16 are coupled with each other facing each other to form the housing or seat A, in the form of a tube, for the corresponding cable.

Obviously, for each half-saddle 12, 13, it is possible to provide various grooves 16, as illustrated for example in FIG. 5 where there are two grooves 16, so that each saddle 1 can hold two or more cables.

FIG. 10, for example, illustrates a saddle 1 with a single housing A for a cable C, formed by the coupling of two grooves 16 present, each on a half-saddle 12, 13.

According to the present invention, said grooves 16 of each half-shell 12, 13 are provided with a series of radial protrusions 21 produced in the form of a half-ring or arc of a ring on each half-saddle and in a coupled condition of said half-saddles 12, 13 with each other, said radial protrusions 21 are positioned facing each other to form at least one continuous ring, or continuous annular band 23 for retaining the cable C inside the saddle.

Said radial protrusions 21 are produced as half-rings protruding from the casing surface M of the groove 16 towards the inside of each seat A, with a concavity concordant with that of the grooves 16.

The casing surface N of said rings 23 formed by the coupling of said radial protrusions 21 is destined for housing the cable C.

Said radial protrusions 21 are produced as half-rings which form a ring 23 having a certain thickness.

Said at least one continuous ring or continuous annular band 23, in fact, has a thickness, i.e. a longitudinal extension, which is such as to form a friction surface with the casing surface of said elongated body.

Said radial protrusions 21 are also made of elastomeric material.

Each radial protrusion 21 of each groove 16 of a half-saddle 12, which is coupled, under an assembled condition of the saddle, with the corresponding radial protrusion 21 provided in the groove 16 of the opposite half-saddle 13, forms half of the retaining ring 23.

Said radial protrusions 21 and therefore said rings 23 are positioned, in one embodiment, equidistant from each other along the longitudinal extension of the grooves 16 of each half-saddle 12, 13.

Said radial protrusions 21 of each half-saddle 12, 13 are positioned so that, in the coupled condition of the two half-saddles 12, 13, they face each other so as to reduce, in correspondence with the ring 23 that they form, the internal diameter of the seat/housing A of the cable C.

As shown in the figures, said radial protrusions 21 and therefore the ring 23 are preferably provided in correspondence with the head T and tail T' side of the saddle 1.

Said radial protrusions 21 cause the lumen of the housing or seat A for the cable C to consist of depressions interspersed with protruding rings 23, i.e. the diameter of said housing A is not constant for the whole longitudinal extension of the saddle 1 but has a reduced size in correspondence with said rings 23 formed by two corresponding protrusions facing each other 21.

Said rings 23 form reductions in the width of the seat A, i.e. they reduce its diameter allowing, also thanks to the use of the elastomeric material which creates attrition and/or friction on the sheath of the cable C, the fixing of cables with a wide range of diameters, i.e. a single saddle 1 produced according to the invention can house cables having different diameters.

As illustrated in FIG. 12, in correspondence with said rings 23, the retaining pressure exerted on the cable C is uniformly distributed over the whole diameter of the cable C and avoids the presence of areas having a greater pressure or perforation areas of the lining sheath of the cable C which are created, for example, with the devices of the prior art which provide retention notches or flaps.

Each ring 23, when the cable C is inserted and the half-saddles 12, 13 are coupled, becomes constantly deformed along its entire perimeter so as to exert a pressure distributed over 360° on the cable C, which avoids perforations of the lining sheath of the cables.

As illustrated in FIG. 9, which shows the face B of the base 15a of the internal portion or core 15, said radial protrusions 21 are positioned in correspondence with rectangular windows or slots 22 provided on said base 15a.

Cables having a diameter smaller than the diameter of the housing A obtained by coupling the corresponding semicircular grooves 16 provided, (at least one), on each half-shell 12, 13, are withheld by means of the reductions or radial protrusions 21 which form rings 23, also made of elastomeric material, thanks to the friction and pressure generated between the core 15, in particular between the protrusions 21 and the outer sheath of the cable C.

Thanks to the present invention, the blocking of the cables in the saddles, whether they be in a vertical or horizontal position with respect to the ground, always takes place due to the effect of friction and pressure uniformly distributed, rather than by mechanical interference between the teeth 110, 110a or flexible flaps and the sheath of the cable C, as in the case of the cable clamps of the prior art.

Thanks to the deformability of the elastomeric material of which both the core or internal portion 15 of each half-saddle 12, 13, facing the cable C to be fixed, and the protrusions 21/rings 23 are made, it is possible to install on supports (not shown), with the same saddle 1, cables having different diameters (cables with an increasing or decreasing diameter): the housing A of the saddle 1 can hold cables having a diameter equal to (or similar) to the diameter of the housing A in correspondence with the radial protrusions 21/rings 23 and cables with increasingly larger diameters up to a diameter equal to or similar to the diameter of said housing A measured not in correspondence with said protrusions 21/rings 23 but in the space between two adjacent protrusions 21/rings 23 along the groove 16, i.e. cables having a radius equal to the radius of the semi-circular groove 16.

The casing surface of said cables will in fact be abutted against the casing surface M of said grooves 16, i.e. that between a radial protrusion 21/ring 23 and the adjacent one.

In the case, in fact, of fixing cables having a large diameter, i.e. equal to or similar to the diameter of the housing A obtained from the coupling of the corresponding grooves 16 of each half-saddle 12, 13, the radial protrusions 21 which form the retaining rings 23 collapse on themselves, always ensuring an adequate friction and a constant pressure uniformly distributed in correspondence with said rings 23, between the saddle 1 and the sheath of the cable C.

Whereas in the case of cables having a reduced diameter, it will be the inner casing surface N of the rings 23 formed by the radial protrusions 21 that will cause friction and block the cable C.

In order to facilitate the deformation of the radial protrusions 21 which act as reducers of the internal diameter of the seat A for the cables, when the saddle 1 is used with large-diameter cables (i.e. cables having a diameter greater than the diameter of the seat A in correspondence with the radial protrusions 21), windows/slots 22 are provided on the base 15a of the internal portion or core 15, which form outlets in correspondence with the reductions 21, i.e. the elastomeric material of which said radial protrusions 21 are made, deformed by the thrust exerted by the cable C having a large diameter fixed in the saddle 1, can migrate inside said slots 22 which therefore act as a reservoir for the material of which the deformed protrusion 21 is made.

With the saddle 1 object of the present invention, cables having a range of diameters equal to 3-4 mm can be blocked, against the range of about 1 mm allowed by traditional saddles, made entirely of plastic materials: the groove or grooves 16 of each half-saddle 12, 13 in combination with said radial protrusions 21 which constitute retaining rings 23, form a housing or seat A, in the form of a tube, for elongated bodies which can vary in diameter up to 3-4 mm with respect to the diameter of an elongated body having a diameter substantially identical to the diameter of said housing or seat A measured not in correspondence with said radial protrusions 21.

The saddle 1 of the invention illustrated in FIGS. 5 to 9 and 13 can house two cables, whereas FIGS. 10, 11 and 14 illustrate another embodiment of the saddle 1 of the invention that can house a single cable C: the body 11 of the saddle 1 is longitudinally crossed by a hole (seat or housing A) for housing the cable C.

It should be understood that the invention is not limited to the embodiments illustrated in these figures, as the saddle 1, or rather the half-saddles 12, 13, can have a different number of grooves 16 for forming corresponding seats for as many cables with different diameters.

The saddle 1 of the invention can therefore be inserted into a U-bolt together with other saddles, and is capable of correctly transmitting the clamping pressure thanks to its outer body made of plastic material.

The same saddle, having the internal block made of elastomeric material, allows cables with a wide range of diameters to be fixed without the risk of perforating the outer sheath of the cables, which, in the case of optical-fiber cables, is generally relatively thin and made with materials which are not particularly rigid.

In the drawings so far presented, two embodiments of the saddle of the invention have been illustrated, one provided with two seats for the cables and the other provided with one seat for a single cable C; the possibility of producing saddles equipped with an increasing number of cable seats (up to six), however, is not excluded.

By way of example, FIG. 13 illustrates the cable clamp of FIG. 1 with the saddle of FIG. 5 produced according to the present invention.

Similarly, FIG. 14 illustrates the cable clamp of FIG. 2 with the saddle of FIG. 10 produced according to the invention.

The invention claimed is:

1. A saddle (1) for supporting an elongated body, comprising:
    a body with a rectangular or quadrangular section (11), obtained by coupling two half-saddles (12,13), each half-saddle (12,13) comprising an outer portion or shell (14) made of a plastic material and an internal portion or core (15) made of an elastomeric material, on which one or more grooves (16) are defined for housing said elongated body,
    wherein each groove (16) of each half-saddle (12,13) is provided with one or more radial protrusions (21) made of the elastomeric material shaped as a half-ring or arc of a ring and, in a coupled condition of said half-saddles (12,13) with each other, said one or more radial protrusions (21) are positioned facing each other so as to form at least one continuous ring (23) for retaining the elongated body in said one or more grooves (16),
    wherein there is a plurality of said radial protrusions (21) positioned equidistant from each other along a longitudinal extension of the one or more grooves (16) of each half-saddle (12,13) and, in the coupled condition of the two half-saddles (12,13), facing each other so as to form the at least one continuous ring (23) which reduces, in correspondence with said at least one continuous ring (23), an internal diameter of a housing or seat (A) for the elongated body, to allow a fixing, between the two half-saddles (12,13) of elongated bodies having a wide range of diameters, and
    wherein said radial protrusions (21) are positioned in correspondence with rectangular windows or slots (22) provided on a base (15a) of the internal portion or core (15), inside which the elastomeric material of said radial protrusions (21), deformed when pressure is exerted by the elongated body closed between the two half-saddles (12,13) and positioned in contact with said radial protrusions (21), can be compacted.

2. The saddle (1) according to claim 1, wherein the one or more grooves (16) of each half saddle (12,13) in combination with said radial protrusions (21) form a housing or seat (A), shaped as a tube, for the elongated body that can vary in diameter up to 4 mm with respect to a diameter of the elongated body having a diameter substantially identical to a diameter of said housing or seat (A) measured not in correspondence with said radial protrusions (21) which form the at least one continuous ring (23).

3. The saddle (1) according to claim 1, wherein said at least one continuous ring (23) has a longitudinal extension sufficient to form a friction surface with a casing surface of said elongated body.

4. The saddle (1) according to claim 1, wherein said at least one continuous ring (23) exerts a uniformly distributed pressure on a circumference of the elongated body housed in said one or more grooves (16).

5. The saddle (1) according to claim 1, wherein the outer portion or shell (14) of each half-saddle (12,13) consists of a base (14a) and two side walls (14b), said base (14a) having a square or rectangular shape, and wherein the corresponding internal portion or core (15) is shaped as a compact block made of the elastomeric material with a rectangular or square section.

6. A saddle (1) for supporting an elongated body, comprising:
    a body with a rectangular or quadrangular section (11), obtained by coupling two half-saddles (12,13), each half-saddle (12,13) comprising an outer portion or shell (14) made of a plastic material and an internal portion or core (15) made of an elastomeric material, on which one or more grooves (16) are defined for housing said elongated body,
    wherein each groove (16) of each half-saddle (12,13) is provided with one or more radial protrusions (21) made of the elastomeric material shaped as a half-ring or arc of a ring and, in a coupled condition of said half-saddles (12,13) with each other, said one or more radial protrusions (21) are positioned facing each other so as to form at least one continuous ring (23) for retaining the elongated body in said one or more grooves (16),
    wherein a coupling between the outer portion or shell (14) and the internal portion or core (15) is effected by at least one tooth (17) present on said internal portion or core (15), which is inserted in at least one corresponding seat (18) formed on said outer portion or shell (14), and
    wherein said at least one tooth (17) is positioned externally on a side wall (15b) of the internal portion or core (15) and is snap-inserted, having a sloping invitation surface, into the at least one corresponding seat or opening (18) present on the side wall (14b) of the outer portion or shell (14).

7. The saddle (1) according to claim 6, wherein the at least one tooth comprises two teeth (17) provided on a side wall (15b) of the internal portion or core (15) and a single tooth (1) provided on an opposite side wall (15b), positioned for becoming engaged in the corresponding seats or openings (18) provided on the side wall (14b) of the outer portion or shell (14).

8. A saddle (1) for supporting an elongated body, comprising:
    a body with a rectangular or quadrangular section (11), obtained by coupling two half-saddles (12,13), each half-saddle (12,13) comprising an outer portion or shell (14) made of a plastic material and an internal portion or core (15) made of an elastomeric material, on which one or more grooves (16) are defined for housing said elongated body,
    wherein each groove (16) of each half-saddle (12,13) is provided with one or more radial protrusions (21) made of the elastomeric material shaped as a half-ring or arc of a ring and, in a coupled condition of said half-saddles (12,13) with each other, said one or more radial protrusions (21) are positioned facing each other so as to form at least one continuous ring (23) for retaining the elongated body in said one or more grooves (16), and
    wherein a coupling between the outer portion or shell (14) and the internal portion or core (15) is effected by at least one discontinuous projection (19), which extends longitudinally on an inner face of a base (14a) of the outer portion or shell (14), and which is combined with at least one corresponding neck (20) formed longitudinally on a face (B) of a base (15*a*) of the internal portion or core (15) facing the portion or shell (14) in an assembled condition of the half-saddle (12,13).

9. The saddle (1) according to claim 8, wherein said at least one discontinuous projection (19) and said at least one neck (20) are formed in a central position, longitudinally on said base (14*a*) of the outer portion or shell (14) and said base (15*a*) of the internal portion or core (15) in a direction of the one or more grooves (16) for housing said elongated body.

10. The saddle (1) according to claim 1, wherein a coupling between the outer portion or shell (14) made of the plastic material and the internal portion or core (15) made of the elastomeric material is effected by pre-assembly or by co-molding.

11. The saddle (1) according to claim 1, wherein the one or more grooves (16) for housing said elongated body are one or more longitudinal grooves with a semi-circular profile formed in the internal portion or core (15) and, with a coupling of two half-saddles (12,13), the one or more grooves (16) of each half-saddle (12,13) are positioned facing each other to form the housing or seat (A), in the form of a tube, for the elongated body.

12. The saddle (1) according to claim 1, wherein at least one of two side walls (14*b*) of the outer portion or shell (14) has, externally, at least one recess which forms a seat (14*c*) for an arm of a U-bolt (101*c*) of a cable-clamp and a clip or flap (14*d*) for fixing said U-bolt (101*c*) to the arm.

13. The saddle (1) according to claim 1, wherein the outer portion or shell (14) is made of a rigid plastic material.

14. The saddle (1) according to claim 1, wherein the saddle (1) is configured to be stacked on a cable-clamp comprising a U-bolt (101*c*), and a thrust plate (102*c*) with a blocking screw (103*c*).

\* \* \* \* \*